United States Patent

Herman

[15] 3,684,302
[45] Aug. 15, 1972

[54] CENTERING AND HOLDING FIXTURE

[72] Inventor: Martin A. Herman, 2085 W. 114th St., Cleveland, Ohio 44102

[22] Filed: Aug. 5, 1970

[21] Appl. No.: 61,351

[52] U.S. Cl. .................................. 279/75, 279/1 B
[51] Int. Cl. ........................................... B23b 31/22
[58] Field of Search .................. 279/22, 30, 75, 1 B

[56] References Cited

UNITED STATES PATENTS

| 3,398,965 | 8/1968 | Cox ........................... 279/30 |
| 2,143,010 | 1/1939 | Imblum ....................... 279/75 |
| 685,677 | 10/1901 | Furbish ....................... 279/22 |

Primary Examiner—Francis S. Husar
Attorney—Oldham & Oldham

[57] ABSTRACT

Disclosed is a quick-acting centering and holding fixture. The fixture has a hollow inner sleeve which has a series of bores extending radially through its walls and uniformly spaced on the circumference. Steel balls of greater diameter than the sleeve walls are carried in the bores. An outer sleeve which has a tapered bore slides over the inner sleeve and forces the balls radially inwardly to hold and center the part being clamped. Suitable means between the outer sleeve and a shoulder of the inner sleeve serves to force the inner sleeve along the outer sleeve so that the balls may be retracted into the tapered portion of the bore of the outer sleeve.

9 Claims, 15 Drawing Figures

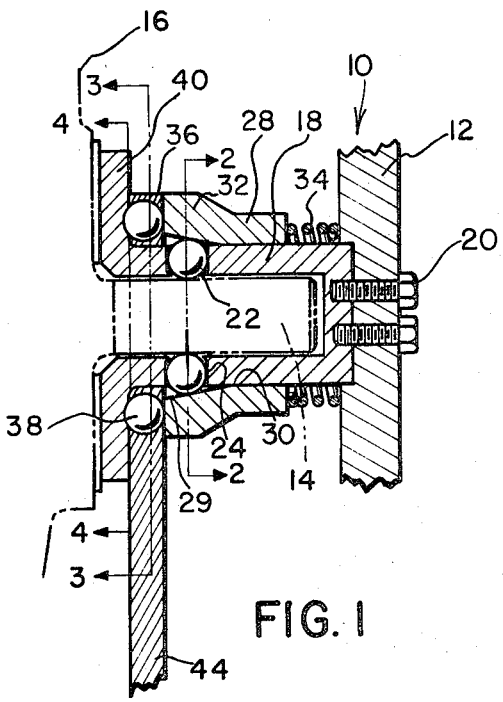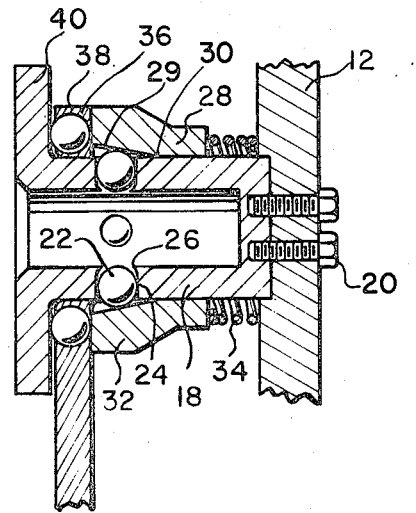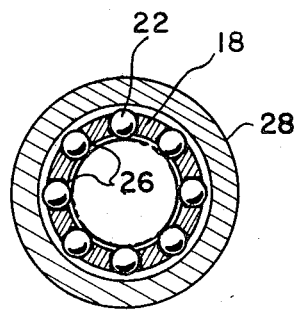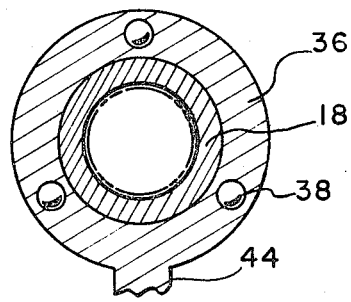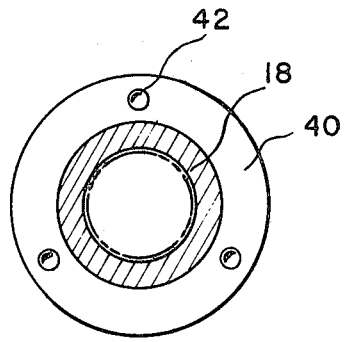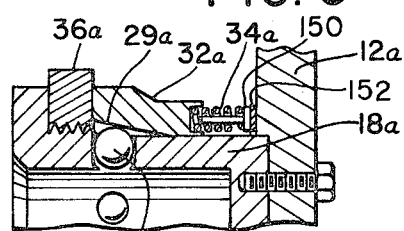
INVENTOR.
MARTIN A. HERMAN
BY Oldham and Oldham
ATTORNEYS

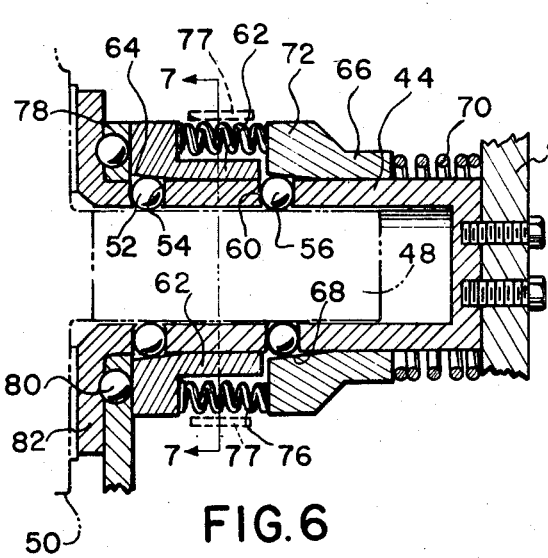
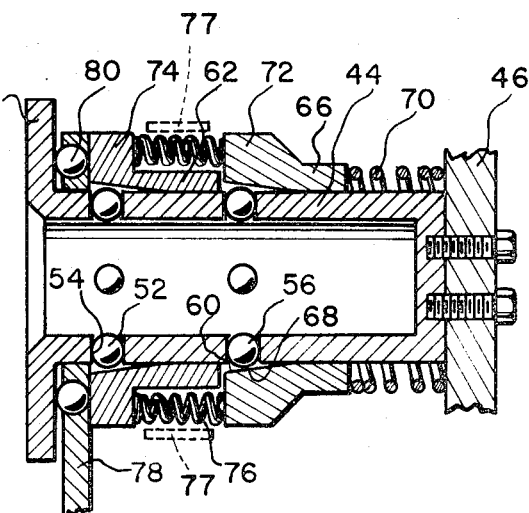
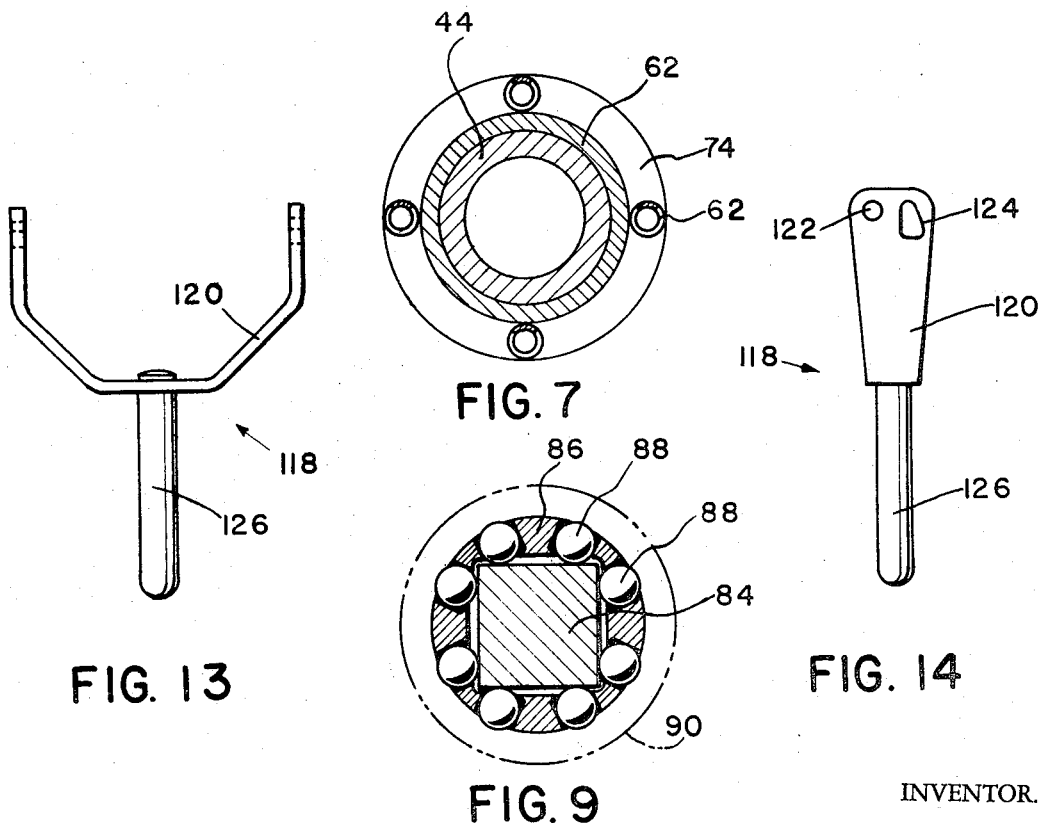

INVENTOR.
MARTIN A. HERMAN

ATTORNEYS 3,684,302

CENTERING AND HOLDING FIXTURE

This invention relates to a centering and holding fixture and more particularly to such a fixture which is of fast but positive action.

The uses of centering and holding fixtures are numerous and include the holding of parts to be checked by a contour gauging fixture. Such holding fixtures must be capable of accurately centering the object and preferably, of simple, sturdy, easily usable construction.

It is the primary object of the present invention to provide a centering and holding fixture which is capable of accurately centering a part.

It is also an object of the invention to provide such a fixture which is of simple, sturdy, and trouble-free construction.

A further object of the invention is the provision of a centering and holding fixture which is capable both of centering the device and of holding the object in correct axial alignment in the fixture.

Another object of the invention is the provision of a centering and holding fixture which is capable both of centering a part and of aligning the part relative to a reference axis.

The above and other objects of the invention which will become apparent in the following specification are achieved in the present invention by providing a centering and holding fixture which consists of an inner sleeve which receives the shank or end of the object to be held, a number of balls arranged in radially extending bores spaced circumferentially around the inner sleeve and of greater diameter than the thickness thereof, an outer sleeve having a tapered inner bore to urge the balls radially inwardly to clamp and align the object, and the combination of biasing means to urge the outer sleeve into a position where the balls are forced inwardly and a camming plate, or similar member to force the outer sleeve in the opposite direction.

For a more complete understanding of the invention, reference should be had to the following specification and the accompanying drawing wherein there is shown a preferred embodiment of the invention.

In the drawing:

FIG. 1 is a vertical sectional view of a first embodiment of the centering and holding fixture of the present invention;

FIGS. 2, 3 and 4 are sectional views taken along the lines 2—2, 3—3 and 4—4, respectively, of FIG. 1;

FIG. 5 is a view, similar to that of FIG. 1 but showing the fixture in its open position;

FIG. 6 is a vertical sectional view of a second embodiment of the centering and holding fixture of the present invention;

FIG. 7 is a sectional view taken along the line 7—7 of FIG. 6;

FIG. 8 is a view similar to that of FIG. 6 but showing the fixture in its open position;

FIG. 9 is a transverse sectional view of a third embodiment of the centering and holding fixture of the present invention;

FIG. 13 is a plan view of the handle used to release the fixture of FIG. 10;

FIG. 14 is a side elevational view of the handle of FIG. 13; and

FIG. 15 is a fragmentary section of a further embodiment of the invention.

Figure 11:
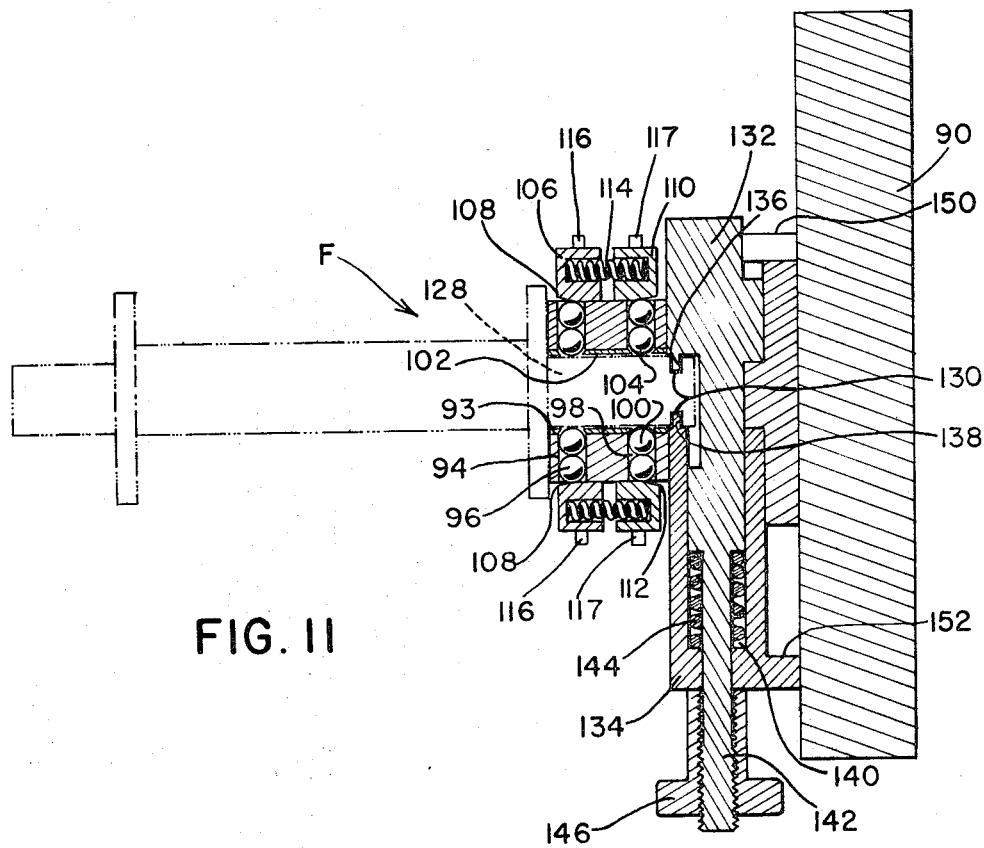
FIG. 11 is a sectional view taken along the line 11—11 of FIG. 10.

Referring first to FIGS. 1–5, a first embodiment of the invention will now be described. The fixture, designated generally by the reference numeral 10 is mounted on a suitable base 12 and receives the shank or end portion 14 of an object 16. The base 12, for example, may be secured in a gauge as shown in my prior U. S. Letters Pat. No. 2,964,850.

The fixture 10 has an inner sleeve 18 which has a central bore for receiving the shank 14 and which is fastened to the base 12 by bolts 20 or other suitable fastening means. A plurality of steel or other hardened metal or material balls 22 are provided at spaced intervals around the circumference of the sleeve 18. The diameters of the balls 22 are somewhat greater than the thickness of the wall of the sleeve 18. The balls 22 have a slide or slip fit in annular openings or recesses 24 which have reduced diameter inner end portions 26 to prevent the balls 22 from falling inwardly to the bore of the sleeve 18. Slidable on the outside of the sleeve 18 is an outer sleeve 28 which has a beveled portion 29 on its inner bore 30 at one end. The sleeve 28 is urged toward the outer end of the inner sleeve 18 by suitable biasing means such as a spring 34. The outer sleeve 28 also has an enlarged shoulder portion 32. A release means such as a plate 36 which carries three steel or other hard material balls 38 protruding from the surface thereof at normally equally spaced intervals is held between the sleeve 28 and an enlarged collar or flange portion 40 of the inner sleeve 18. The face of the collar 40 against which the balls 38 are pressed has a series of detents 42, as shown in FIG. 4. When the plate 36 is in the position shown in FIG. 1, the balls 38 are received in the detents 42 and the spring 34 urges the collar 28 toward the open end of the sleeve 18 so that the beveled portion 29 forces the balls 22 inwardly into clamping engagement with the shank 14. When the plate 36 is rotated, by a handle 44, the balls 38 move out of the detents 42 forcing the plate 36 away from the collar 40 and forcing the sleeve 28 against the spring 34. The balls 22 are now free to and will readily move radially outwardly into the space provided by the beveled end of the bore of the outer sleeve 28, thus releasing or unclamping the shank 14.

It will be seen that since the outer collar 28 moves axially along the inner sleeve 18, all of the balls 22 are forced inwardly the same distance and with the same amount of force so that the shank 14 is gripped evenly usually at uniformly spaced peripheral portions thereof and properly centered within the sleeve 18.

A second embodiment of the invention is shown in FIGS. 6 – 8. In this embodiment there is provided a sleeve 44 which is fastened to a suitable base 46 and which receives the shank or end 48 of the part 50. The sleeve 44 is provided with two or more series of metal balls 52 and 56 which are received in bores 54 and 60, respectively. As in the previously described embodiment, the balls 52 and 56 are of greater diameter than the thickness of the wall of the sleeve 44 and are arranged at uniformly spaced intervals about the circumference of the sleeve 44. A first outer sleeve or collar 62 which has a beveled bore 64 at one end thereof is provided to force the balls 52 radially inwardly and a second outer collar or sleeve 66 having a beveled bore 68 at one end thereof is provided to force the balls 56 radially inwardly. A suitable spring 70, or a plurality of spring means, urges the collar 66 toward the open end of the sleeve 44 to force the balls 56 inwardly. The sleeve or collar 66 has an enlarged shoulder 72 and the collar 62 has an enlarged shoulder 74. Coil springs or similar means 76 received between the shoulders 72 and 74 urge the collar 62 toward the open end of the sleeve 44 to force the balls 52 radially inwardly. Any suitable means may be employed to retain the springs 76 in place. For example, a sleeve 77 may be provided for this purpose. The spring means 70 are stronger than the spring means 76 to urge the sleeves 62 and 66 axially toward operative clamping positions. As in the previous embodiment, a camming plate 78 which carries a number of balls 80 and which bears against the shoulder 82 of the sleeve 44 is provided to force the sleeve 62 axially rearwardly to release the balls 52. The rear end of the sleeve 62 preferably can contact the second collar 66 to force it rearwardly and also release the balls 56, or the sleeve 62 at least will exert a releasing force on the sleeve or collar 66.

In this embodiment, the uniform inward motion of the balls 52 and 56 assures not only the correct centering of the shank 48, but also, since the balls act at two axially spaced intervals, assures that the shank will be aligned along an axis normal to the plane of the base 46.

While in the embodiments described above, the shank of the object is round, the centering and holding fixture of the present invention may be adapted to receive shanks of other cross-sectional configuration. For example, as shown in FIG. 9, a square shank 84 may be centered by using a fixture in which an inner sleeve 86 is provided with closely spaced pairs of steel balls 88, received in openings like the recesses 24; which pairs of balls are located at four equally spaced points around the sleeve 86 and which when forced inwardly by an outer sleeve 90, similar to the sleeve 28, clamp against the four corners of the shank 84. The fixture of FIG. 9 may be of the construction shown in either FIG. 1 or FIG. 6, as desired. Obviously, other arrangements may be used to hold and center shanks of other cross-sectional configurations, and the annular contours of the sleeves 86 and 90 may be modified to correspond to the shank contour, if desired.

Any desired biasing means may be used to urge the collars or sleeves in the units of the invention axially towards article engaging positions.

The shafts 14 and 48 may be tapered or cylindrical and only a small clearance, such as 0.005 inch, is required between the shafts and the bore of the sleeves 18 and 44 to provide rapid and accurate positions of the test articles in a gauge or other article.

The embodiments shown in FIGS. 10 – 14 are capable of both centering the part to be tested and aligning the part with respect to a predetermined reference angle. This embodiment is of particular utility where the part to be tested has a contour which is not a surface of revolution about the axis of the part.

The holding and centering fixture of this embodiment is provided with a suitable base 90. Secured to the base is a body portion 92 which has an opening for receiving the shank portion 128 of the part to be tested. As will be seen from FIGS. 10 and 11, the body portion 92 has an upper series of bores 94 which extend radially outwardly from the open center 93 of the body portion 92. Two steel balls 96 are received in each of the bores 94. A second series of radially extending bores 98 are provided in the lower portion of the body 92 and two balls 100 are received in each of these bores. In this embodiment, each of the bores 94 and 98 is a through bore and a retainer sleeve 102 is provided in the central opening of the body portion 92. This sleeve has beveled openings 104 in alignment with each of the bores 94 and 98 and serves to retain the balls 96 and 100 in their respective bores 94 and 98.

It will be noted that two or more balls are provided in each of the bores 94 and 98. The sum of the diameter of the two balls is greater than the combined thickness of the wall of the retaining sleeve 102 and the wall of the body portion 92 so that the balls project either inwardly through the openings 104 or outwardly beyond the outer surface of the body portion 92. Slidable on the outer surface of the body portion 92 are a pair of rings 106 and 110. The ring 106 has an inner bore 108 which is tapered at its upper end and which overlies the balls 96. The lower ring 110 likewise has a bore 112 which is tapered at its lower end and which tapered end overlies the balls 100. As in the previous embodiments, when the tapered portions of the bores of the rings 106 and 110 are forced over the balls 96 and 100, respectively, the balls are forced inwardly to clamp against the shank portion 128 of the part being tested. However, the rings 106 and 110 are forced in opposite directions in this embodiment of the invention.

Suitable means, such as coil springs 114, are provided to force the rings 106 and 110 normally and thus force the balls 96 and 100 inwardly. In order to release the clamping action there are provided pins 116 and 117 on the rings 106 and 110, respectively but other suitable release or control means may be used. An activating handle, illustrated in FIGS. 13 and 14, engage these pins 116 and 117 and acts to pull the rings 106 and 110 together thus permitting the balls 96 and 100 to move radially outwardly within their respective bores. The actuating handle 118 has a forked or C-shaped portion 120 the ends of which are each provided with a hole 122 for engaging the upper pin 116 and a slot 124 for engaging the lower pins 117. The longitudinal axis of the slot 124 diverges slightly from an arc centered on the pin 122. The actuating handle 118 which is of suitable shape is shown to include a handle 126 which is secured to the midpoint of the forked piece 120.

The portion of this embodiment described above operates in the same fashion as the previously described embodiment. This is, when a part to be tested is inserted into the central bore 93 of the body portion 92, the balls 96 and 100 can be forced to press radially inwardly uniformly on the sides of the shank 128 of the part to precisely center the part and to clamp it in the holding fixture.

As will be seen from FIG. 11, the lower end of the shank 128 of a part being tested has a pair of flats or grooves 130 in its opposite sides. The present embodiment utilizes these flats or grooves 130 to precisely align the part being tested relative to a fixed angle. To accomplish this aligning of the part being tested, there are provided sliding members 132 and 134 which are provided, respectively, with tips 136 and 138 which can be slid together so as to project into the lower portion of the central bore 93 of the body portion 92 and engage the flats or grooves 130 on opposite sides of the shank 128 of the test part. One of the sliding members 134 is provided with a bore 140 into which the other sliding member 132 projects. A rod-like extension 142 of the sliding member 132 projects outwardly from the end of the sliding member 134. A coil spring 144 is provided within the bore 140 of the sliding member 134 and surrounding the rod-like extension 142 of the sliding member 132. This spring 144 acts to urge the tips 136 and 148 of the sliding members 132 and 134 apart. The outer end of the rod-like projection 142 is threaded to receive a nut 146 which bears against the end of the sliding member 134. Tightening of the nut 146 thus causes sliding members 132 and 134 to move relative to one another in a manner which brings the aligning tips 136 and 138 together.

The aligning of the parts to be tested may be accomplished by first positioning the shank portion 128 of the part in the bore 93 and centering and clamping the shank by the action of the balls 96 and 100. The nut 146 is then turned on the threaded portion 142 to move sliding members 132 and 134 relative to one another so that the aligning tips 136 and 138 are moved inwardly into the slots or flats 130 of the shank 128. If the part is not correctly angularly aligned, the aligning tips 136 and 138 will force the part to rotate until correct alignment is achieved.

It will be realized that one or more balls 96 and 100 may be received in the bores 94 and 98 as long as the total diametric length of the ball or balls is slightly greater than the combined radial thickness of the sleeve 102 and the length of the bores 94 and 98. Likewise one or a series of balls may be used in the structures shown in FIGS. 1 through 9 depending on the size of the units and the construction desired. A retaining sleeve, like the sleeve 102, may be used in such other constructions as desired. However it is contemplated that the clamping balls can be replaced by pins having semi-spherical or other tapered ends thereon for engaging tapered bore sections on control sleeves in the apparatus. These pins are preferably positioned to be retained gainst rotation on their axes and have a suitable effective length to clamp against the shank of a test article when forced radially inwardly by axial movement of a sleeve having a tapered bore portion engaging one end of the pins.

The clamping pins or balls can be uniformly or non-uniformly positioned as desired but at least three clamping means should be used and have no means spaced more than 180° from any circumferentially adjacent means.

The release means, such as the plate 36 of FIGS. 1 to 5, may be threadedly engaged with sleeve 18 for a different type of a cam action release. FIG. 15 thus shows a sleeve 18a on a base 12a. A lock ring 36a threadably engages the sleeve 18a while springs 34a force an end of an outer sleeve 32a against an edge of the lock ring. The outer sleeve has a bore tapered at one end 29a thereof for the control actions previously described. Only a fraction of a turn of the lock ring will act to lock or release the balls 22a of a set of balls in relation to the shank of a test article received in the sleeve 18a. The springs 34a have headed centering pins 150 engaged therewith while a washer 152 aids in holding the pins 150 and springs 34a in engagement if the sleeve and spring unit is rotated for article release or engaging action.

Figure 10:
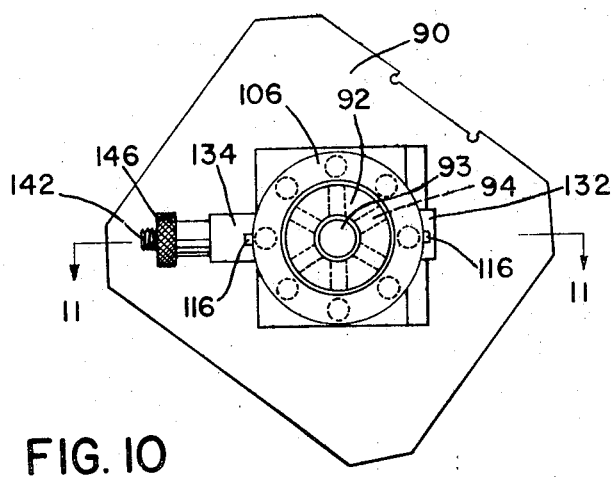
FIG. 10 is a plan view of a modified holding and centering fixture which is capable of also aligning the part to be tested relative to a reference angle.
Figure 12:
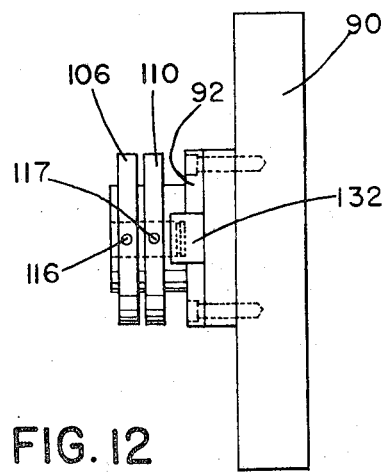
FIG. 12 is a side elevational view of the holding and centering fixture of FIG. 10.

When centering a test specimen in the apparatus of FIGS. 10 to 12, naturally the specimen is placed in the unit about at a desired angle so that the final angle positioning is provided by the apparatus.

The actuating handle 118 is shown separately from the fixture F of FIGS. 10 to 12 for clarity. Normally the handle would have the pins 117 at the smaller end of the slot 124 which may have a slight seating recess formed therein for such pins. This retains the springs 114 slightly compressed and facilitates turning the test specimen to its end position. Then a slight force on the operating handle serves to release the springs to force the oppositely tapered ends of the bores 108 and 112 into engagement with the sets of balls 106 and 110 for clamping action on the test specimen.

Obviously the fixture F or other units of the invention may engage with either the top and/or bottom end of a test article which can be rotated on its axis in the fixture in either clamped or released position. The top fixture can be carried by a swing arm or slide arm secured, for example, in a vertically adjustable manner, to a vertical post in a gauge as in my prior patent. The fixtures of the invention may be used on any suitable gage or other support. Naturally when two fixtures are used to engage a test article, they are on a common centerline, usually vertical.

For ease of movement, slides 132 and 134 have support blocks 150 and 152 provided thereon engaging the base 90.

The fixture F is adapted to bring the test specimen into any desired reference relation to a reference line or plane as indicated by the line 11–11 of FIG. 10. The arcuate position of the specimen on its own axis is determined by the flats provided by the grooves 130 on their inner walls. However other flats, or centering portions may be provided on the test article so that a complementary slide means and a diametrically opposed clamp, for example, operatively carried by or associated with the slide means can engage the article to position it at a desired angle on its longitudinal axis to a reference line or plane. Also, while specific reference has been made to the aligning of a part having a pair of flats or grooves in its shank portion, the tips 136 and 138 and/or slide means may be modified so as to be used with parts having other configurations. For example, the tips 136 and 138 may be in the form of tapered pins to accomplish the angular alignment of a part having a hole extending transversely through its shank portion.

In FIG. 15, the ring 36a must be capable of sufficient axial movement on the sleeve 18a to lock or release the balls 22a or other force transmission means onto or from engagement with the shank of a test article and in the position shown the balls 22a would be in article engaging position.

The fixtures of the invention will provide a faster, easier to use, and/or a more positive location of a test article for gauging or other actions thereon.

It will be understood that while specific embodiments of the invention have been described, the invention is not so limited but may be changed or modified. Reference should therefore be had to the appended claims in determining the true scope of the invention.

What is claimed is:

1. A centering and holding fixture, comprising:
   an article receiving sleeve having a plurality of openings extending radially in a plane normal to the axis of the sleeve and an external shoulder;
   a force transmitting means slidably received in each of the openings;
   a collar having a bore therein tapered outwardly at one end thereof, the collar being slidable on the sleeve between a first position in which the tapered portion of the bore thereof overlies and engages said means to force them inwardly and a second position in which the tapered portion does not engage said means;
   biasing means normally holding the collar in the first position; and
   an annular ring positioned between the collar and the external shoulder, the face of the ring adjacent the shoulder having at least one projection and the face of the shoulder adjacent the ring having at least one recess aligned with the projection when the ring is in a first position release movement of the collar is effect upon rotation of the ring.

2. The centering and holding fixture according to claim 1 wherein the sleeve has a second plurality of openings extending radially in a plane normal to the axis of the sleeve and spaced from the firstmentioned opening, and including force transmitting means being received in each of the second openings, and a second collar having a bore therein tapered outwardly at one end thereof, the second collar being slidable between a first position in which the tapered portion of the bore thereof overlies and engages the force transmitting means in the second openings to force them inwardly and a second position in which the tapered portion does not engage the means, rotation of the ring also effecting release movement of the second collar.

3. The centering and holding fixture according to claim 1 wherein the force transmitting means comprise balls of greater diameter than the thickness of the wall of the sleeve.

4. A centering and holding fixture, comprising:
   a sleeve open at at least one end and having at least three first openings extending through the sleeve wall in a plane normal to the axis of the sleeve and at least three second openings extending through the sleeve wall in a plane parallel to but spaced from the plane of the first openings;
   a force transmitting means slidably received in each of the openings, the means being of greater length than the thickness of the sleeve wall;
   first and second collars slidably received on the sleeve, each collar having a bore tapered outwardly at one end thereof, the collars being positioned with the non-tapered ends adjacent one another and with the tapered portions of the bores overlying the first and second openings respectively, each collar having a pair of pins projecting outwardly therefrom;
   biasing means normally urging the collars apart so that the tapered portions of the bores contact the force transmitting means; and
   a C-shaped member having a hole at each end for engaging the pins of one of the collars and a slot at the opposite end for engaging the pins of the other collar, the member being rotatable to move the collars together so that the tapered portions of the bores do not contact the force transmitting means.

5. The centering and holding fixture according to claim 4 further including means for angularly aligning the part being held in the fixture comprising first and second sliding members each having a tip portion adapted to engage, respectively, opposite sides of the shank of the part, the sliding members extending through and slidable in an opening in the sleeve perpendicular to the principal bore of the sleeve.

6. The centering and holding fixture according to claim 5 further including means to move the sliding members whereby the tip portions thereof are advanced inwardly into the principal bore to engage opposite sides of the shank of the part and biasing means acting on the first and second sliding members to move the tip portions thereof outwardly from the principal bore when the means moving the sliding members inwardly is released.

7. The centering and holding fixture according to claim 4 wherein the force transmitting means comprises balls.

8. The centering and holding fixture according to claim 1 further including means for angularly aligning the part being held in the fixture, comprising first and second sliding members each having a tip portion adapted to engage, respectively, opposite sides of the shank of the part, the sliding members extending through and slidable in an opening in the sleeve perpendicular to the principal bore of the sleeve.

9. The centering and holding fixture according to claim 8 further including means to move the sliding members whereby the tip portions thereof are advanced inwardly into the principal bore to engage opposite sides of the shank of the part and biasing means acting on the first and second sliding members to move the tip portions thereof outwardly from the principal bore when the means moving the sliding members inwardly is released.

* * * * *